US012715026B2

(12) United States Patent
Aoki et al.

(10) Patent No.: US 12,715,026 B2
(45) Date of Patent: Aug. 25, 2026

(54) PROCESSING METHOD FOR ELECTRONIC/ELECTRIC DEVICE COMPONENT WASTE

(71) Applicant: JX ADVANCED METALS CORPORATION, Tokyo (JP)

(72) Inventors: Katsushi Aoki, Hitachi (JP); Tsubasa Takeda, Hitachi (JP); Norimasa Ohtsuka, Hitachi (JP)

(73) Assignee: JX ADVANCED METALS CORPORATION, Tokyo (JP)

(*) Notice: Subject to any disclaimer, the term of this patent is extended or adjusted under 35 U.S.C. 154(b) by 1093 days.

(21) Appl. No.: 16/966,771

(22) PCT Filed: Jan. 30, 2019

(86) PCT No.: PCT/JP2019/003242

§ 371 (c)(1),
(2) Date: Jul. 31, 2020

(87) PCT Pub. No.: WO2019/151351

PCT Pub. Date: Aug. 8, 2019

(65) Prior Publication Data

US 2021/0039146 A1 Feb. 11, 2021

(30) Foreign Application Priority Data

Jan. 31, 2018 (JP) ................................ 2018-015547

(51) Int. Cl.

*C22B 1/248* (2006.01)
*B07B 11/00* (2006.01)
*B09B 3/35* (2022.01)
*B09B 3/40* (2022.01)
*C22B 7/00* (2006.01)
*C22B 9/16* (2006.01)

(52) U.S. Cl.

CPC ................ *B09B 3/35* (2022.01); *B07B 11/00* (2013.01); *B09B 3/40* (2022.01); *C22B 1/248* (2013.01); *C22B 7/00* (2013.01); *C22B 9/16* (2013.01)

(58) Field of Classification Search

CPC .... Y02W 30/52; C22B 15/0056; C22B 1/248; C22B 11/02; C22B 7/005; C22B 9/16; Y02P 10/20; B09B 3/40; B09B 3/80; B09B 5/00; B03B 9/061; B07B 4/00; B07B 11/00

USPC ............................................................ 75/652

See application file for complete search history.

(56) References Cited

U.S. PATENT DOCUMENTS 4,834,951 A 5/1989 Schwab et al.
5,611,493 A * 3/1997 Hayashi .............. B29B 17/0408 241/23
6,336,601 B1 1/2002 Ueno et al.
2007/0278139 A1* 12/2007 Cowling .................. B07C 5/36 209/606
2011/0220554 A1 9/2011 Thomas et al.

FOREIGN PATENT DOCUMENTS

| | | | | |
|---|---|---|---|---|
| CN | 101648202 | A | | 2/2010 |
| CN | 201669262 | U | | 12/2010 |
| CN | 102216476 | A | | 10/2011 |
| CN | 104028530 | A | | 9/2014 |
| JP | 64-55395 | A | | 3/1989 |
| JP | 9-78151 | A | | 3/1997 |
| JP | 2000-301131 | A | | 10/2000 |
| JP | 2002-105548 | A | | 4/2002 |
| JP | 2002-194448 | A | | 7/2002 |
| JP | 2003001632 | A | * | 1/2003 |
| JP | 2003112156 | A | * | 4/2003 |
| JP | 2003-213348 | A | | 7/2003 |
| JP | 2015-123418 | A | | 7/2015 |
| JP | 2016-219402 | A | | 12/2016 |
| JP | 2017-170387 | A | | 9/2017 |
| JP | 2017-190529 | A | | 10/2017 |
| WO | WO 2015/098232 | A1 | | 7/2015 |

OTHER PUBLICATIONS

NPL: on-line translation of JP 2003112156 A, Apr. 2003 (Year: 2003).*

NPL: on-line translation of JP-2003001632-A, Jan. 2003 (Year: 2003).*

Japanese Office Action, daled May 18, 2021, for corresponding Japanese Application No. 2019-569193, with an English ma ansla-tion.

Japanese Notice of Reasons for Refusal for corresponding Japanese Application No. 2021-137502, dated Aug. 30, 2022, with an English translation.

Oki et al., "Advanced Physical Separation Technology for Rare Metal Recycling," Environmental-Resources Engineering, Japan, Resources Processing Society, vol. 58, No. 3, 2011, pp. 95-100, 6 pages total, with an English abstract.

Chinese Office Action and Search Report, dated Jul. 14, 2021. for corresponding Chinese Application No. 201980011068.0, with an English translation of the Chinese Office Action.

(Continued)

*Primary Examiner* — Jie Yang

(74) *Attorney, Agent, or Firm* — Birch, Stewart, Kolasch & Birch, LLP

(57) ABSTRACT

Provided is a method for processing electronic/electrical device component waste, which can increase an amount of electronic/electrical device component waste processed in a smelting step and efficiently recover valuable metals. The method for processing electronic/electrical device component waste includes a step of processing the electronic/electrical device component waste in a smelting step, wherein prior to the smelting step, the method includes a step for reducing smelting inhibitors contained in the electronic/electrical device component waste.

16 Claims, No Drawings

(56) References Cited

OTHER PUBLICATIONS

International Preliminary Report on Patentability for PCT/JP2019/003242 dated May 18, 2020.

International Search Report for PCT/JP2019/003242 mailed on Apr. 23, 2019.

Dupont, et al., “Antimony Recovery from End-of-Life Products and Industrial Process Residues: A Critical Review”, Journal of Sustainable Metallurgy, vol. 2, No. 1, Feb. 8, 2016, pp. 79-103.

Extended European Search Report issued in corresponding European Application No. 19747289.7 on Sep. 22, 2021.

* cited by examiner

PROCESSING METHOD FOR ELECTRONIC/ELECTRIC DEVICE COMPONENT WASTE

FIELD OF THE INVENTION

The present invention relates to a method for processing electronic/electrical device component waste. More particularly, it relates to a method for processing electronic/electrical device component waste, which is suitable for recycling of used electronic/electrical devices.

BACKGROUND OF THE INVENTION

From the viewpoint of resource conservation in recent years, recovery of variable metals from electronic/electrical device component waste such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with copper smelting in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic/electrical device component waste processed may lead to an increase in a carbon component contained in organic substances such as synthetic resins forming the electronic/electrical device component waste, which may cause troubles due to over-reduction in the smelting furnace. On the other hand, since the amount of the electronic/electrical device component waste processed tends to be increased in recent years, there is a need for efficient processing in the copper smelting flash furnace.

As one of methods for suppressing the generation of troubles due to over-reduction in the copper smelting flash furnace, it is proposed that the electronic/electrical device component waste is crushed before processing of the electronic/electrical device component waste in a copper smelting flash furnace to reduce the volume. For example, Japanese Patent Application Publication No. 2015-123418 A (Patent Literature 2) discloses that electrical/electronic device component waste containing copper is incinerated and then crushed to a predetermined size or less, and the crushed electrical/electronic device component waste is processed in a copper smelting furnace.

However, the increased amount of electronic/electrical device component waste processed leads to introduction of a larger amount of unwanted substances (smelting inhibitors) for processing in the subsequent copper smelting step than in the prior arts, depending on types of substances contained in the electronic/electrical device component waste. An increased amount of the smelting inhibitors introduced into such a copper smelting step arises a situation where an amount of the electronic/electrical device component waste to be introduced has to be limited.

Conventionally, many efforts have been made for thermodynamic methods in a smelting step and purifying methods for electrolytic solutions in an electrolytic step of copper smelting, including the smelting inhibitors derived from natural ores. However, there are many problems in the method for processing the electronic/electrical device component waste having very higher contents of the smelting inhibitors than the natural ores.

Citation List

Patent Literatures

[Patent Literature 1] Japanese Patent Application Publication No. H09-78151 A

[Patent Literature 2] Japanese Patent Application Publication No. 2015-123418 A

SUMMARY OF THE INVENTION

In view of the above problems, the present invention provides a method for processing electronic/electrical device component waste, which can increase an amount of electronic/electrical device component waste processed in a smelting step and efficiently recover valuable metals.

As a result of intensive studies to solve the above problems, the present inventors have found that it is effective to carry out processing that can minimize smelting inhibitors contained in the electronic/electrical device component waste, which are carried into the smelting step.

In one aspect, the present invention completed on the basis of the above findings provide a method for processing electronic/electrical device component waste, the method encompassing a step of processing the electronic/electrical device component waste in a smelting step, wherein prior to the smelting step, the method encompasses a step for reducing smelting inhibitors contained in the electronic/electrical device component waste.

In the processing method according to an embodiment of the present invention, the smelting inhibitor refers to a generic term representing an example of substances that affect the quality of products and byproducts in copper smelting and/or substances that affect a copper smelting process.

Specific examples of the smelting inhibitors include substances containing, for example, elements such as antimony (Sb) and nickel (Ni) which affect the quality standard of electrolytic copper as a product obtained by copper smelting; elements regulated by the elution standard for slag as a by-product; origins of fine hydrocarbon particles which affect coloring of sulfuric acid, or resins which affect rapid combustion and smoke leakage in the furnace, or even equipment deterioration due to local heating; elements such as aluminum (Al) and Iron (Fe) which change a slag composition in the copper smelting process, and affect loss of valuable metals into slag, so-called slag loss; and halogen elements such as chlorine (Cl), bromine (Br) and fluorine (F) which affect corrosion of exhaust gas treatment equipment and deterioration of a sulfuric acid catalyst.

In one embodiment of the method for processing the electronic/electrical device component waste according to the present invention, an amount of the electronic/electrical device component waste processed is increased in the smelting step by a decreased amount of the smelting inhibitors contained in the electronic/electrical device component waste.

In another embodiment, the method for processing the electronic/electrical device component waste according to the present invention encompasses the step for reducing the smelting inhibitors contained in the electronic/electrical device component waste before incinerating the electronic/electrical device component waste.

In still another embodiment of the method for processing the electronic/electrical device component waste according to the present invention, the step for reducing the smelting inhibitors encompasses removing component waste containing the smelting inhibitors for each unit of the components from the electronic/electrical device component waste.

In still another embodiment of the method for processing the electronic/electrical device component waste according to the present invention, the step for reducing the smelting inhibitors encompasses sorting and removing the component waste containing the smelting inhibitors for each unit of the components by a physical sorting step.

In still another embodiment of the method for processing the electronic/electrical device component waste according to the present invention, the smelting inhibitors contain Sb.

In still another embodiment of the method for processing the electronic/electrical device component waste according to the present invention, the smelting inhibitors contain at least one selected from the group consisting of Sb, Al, Fe and Ni.

In still another embodiment of the method for processing the electronic/electrical device component waste according to the present invention, the step for reducing the smelting inhibitors includes removing synthetic resins containing Sb.

In still another embodiment of the method for processing the electronic/electrical device component waste according to the present invention, the step for reducing the smelting inhibitors includes: subjecting the electronic/electrical device component waste to wind power sorting in at least two stages to remove at least powdery materials and film-shaped component waste in the electronic/electrical device component waste; and removing synthetic resins in the electronic/electrical device component waste by subjecting the electronic/electrical device component waste classified into heavy weight materials in the wind powder sorting, to sorting using a metal sorter.

In still another embodiment of the method for processing the electronic/electrical device component waste according to the present invention, the smelting step includes a copper smelting step using a smelting furnace.

In still another embodiment of the method for processing the electronic/electrical device component waste according to the present invention, the step of processing the electronic/electrical device component waste in the smelting step includes a step of incinerating the electronic/electrical device component waste; a step of crushing and sieving the incinerated waste; and subjecting the crushed and sieved waste to copper smelting.

According to the present invention, it is possible to provide a method for processing electronic/electrical device component waste, which can increase an amount of electronic/electrical device component waste processed in a smelting step and efficiently recover valuable metals.

DETAILED DESCRIPTION OF THE INVENTION

Hereinafter, embodiments of the present invention will be described.

Smelting Step

A method for processing electronic/electrical device component waste according to an embodiment of the present invention includes a step of processing electronic/electrical device component waste in a smelting step for recovering valuable metals.

When recovering copper as a valuable metal, the smelting step is carried out using a smelting furnace. The smelting step includes: a step of incinerating the electronic/electrical device component waste; a step of crushing and sieving the incinerated waste; and a step of subjecting the crushed and sieved waste to copper smelting. The step of processing the electronic/electrical device component waste is preferably carried out prior to the incinerating step.

As the smelting step according to the present embodiment, for example, a copper smelting step using a flash furnace method can be preferably employed, although not limited thereto. In the copper smelting step using the flash furnace method, for example, copper concentrates, a solvent, and the electronic/electrical device component waste are charged from a ceiling portion of a shaft of the flash furnace. The charged concentrates and the electronic/electrical device component waste are melted in the shaft of the flash furnace to separate a mat containing, for example, from 50 to 68% of copper and slag floating above the mat in a settler of the flash furnace. Valuable metals such as copper, gold, and silver in the electronic/electrical device component waste are absorbed into the mat that is retained in the flash furnace, so that the valuable metals can be recovered from the electronic/electrical device component waste.

In copper smelting, it is important to introduce the electronic/electrical device component waste having lager contents of valuable metals such as copper, gold and silver as the raw material to be processed, as much as possible, and carry out the processing, in order to produce copper and recover larger amounts of variable metals such as gold and silver.

On the other hand, the electronic/electrical device component waste contains substances that would affect the quality of products and byproducts in copper smelting and/or smelting inhibitors that would affect the copper smelting process. For example, the introduction of an increased amount of substances containing elements such as antimony (Sb) and nickel (Ni) as described above may lead to deterioration of the quality of electrolytic copper obtained by copper smelting.

Further, in a non-ferrous metal smelting step such as copper smelting, sulfuric acid is produced from sulfur dioxide generated by oxidation of concentrates. However, when hydrocarbon is mixed into sulfur dioxide, the produced sulfuric acid may be colored. Examples of sources of hydrocarbons include synthetic resins such as plastics, and a large amount of such synthetic resins may be contained depending on the composition of the electronic/electrical device component waste carried into the copper smelting. The synthetic resins may also cause rapid combustion and smoke leakage in the smelting furnace, and even deterioration of equipment due to local heating.

Furthermore, for example, the presence of Al, Fe, or the like over a certain concentration in the smelting furnace may lead to a change of a slag composition in the process of copper smelting, which may affect the loss of valuable metals into the slag, so-called slag loss. Moreover, a large amount of halogen elements such as Cl, Br, and F contained in the electronic/electrical device component waste to be introduced into the smelting furnace may cause corrosion of exhaust gas treatment equipment for copper smelting and deterioration of a sulfuric acid catalyst. Such a problem of contamination of the smelting inhibitors becomes apparent as an amount of the electronic/electrical device component waste processed is increased, which cases a problem that the smelting step is burdened.

The method for processing the electronic/electrical device component waste according to an embodiment of the present invention includes, prior to the smelting step, a step for reducing the smelting inhibitors contained in the electronic/electrical device component waste. This can allow a proportion of smelting inhibitors that are carried into the smelting step to be minimized, and an amount of the electronic/electrical device component waste processed to be increased in the smelting step by a decreased amount of the smelting inhibitors contained in the electronic/electrical device component waste. That is, conventionally, when the contents of the smelting inhibitors in the electronic/electrical device component waste are higher, only a certain amount of the electronic/electrical device component waste can be introduced for stable operation of the smelting step. However, the processing method according to the embodiment of the present invention includes, prior to the smelting step, the step for reducing the smelting inhibitors contained in the electronic/electrical device component waste, whereby the amount of the electronic/electrical device component waste can be increased as compared with that of the prior art, and the proportion of the electronic/electrical device component waste containing copper and valuable metals can be increased to recover copper and valuable metals efficiently.

It is more preferable that a larger amount of the smelting inhibitors contained in the electronic/electrical device component waste is removed. However, there is component waste having the smelting inhibitors and the valuable metals at the same time, depending on the type of the component waste. By removing 1/2, more preferably 2/3 or more, in a weight ratio, of the smelting inhibitors in the entire electronic/electrical device component waste raw material, the electronic/electrical device component waste can be stably processed in the copper smelting step. Furthermore, if a limit amount that can process the smelting inhibitors is the same as the present limit in the smelting process, the smelting inhibitors in the entire electronic/electrical device component waste raw material are decreased, whereby, in the copper smelting step, a larger amount of electronic/electrical device component waste containing a decreased amount of the smelting inhibitors can be processed.

Various types of component waste are mixed in the electronic/electrical device component waste according to an embodiment of the present invention, and the component waste also has different content ratios of metals, plastics, and the like depending on the type of the electronic/electrical device component waste to be supplied. As a result of studies for an effective and valid method for decreasing the smelting inhibitors carried into the smelting step when processing such electronic/electrical device component waste in the smelting step, it was found that it was effective to classify the waste into units of the components and remove selectively the component waste containing the smelting inhibitors for each unit of the components.

As one means for removing the component waste containing the smelting inhibitors for each unit of the components, for example, a physical sorting step using a predetermined physical sorting device can be used. By adopting the physical sorting step using the physical sorting device, an amount of received raw materials that are carried into the smelting step can be increased about twice or more, as compared with the conventional case where all the raw materials of the electronic/electrical device component waste are incinerated or crushed before the smelting process, and the burden on the smelting step can also be reduced. Further, for example, the physical sorting step can increase a sorting efficiency as compared with the case where the smelting inhibitors are selectively extracted from the incinerated materials or the powdery materials obtained by incinerating or crushing the total amount of the electronic/electrical device component waste.

Physical Sorting Step

As used herein, the "electronic/electrical device component waste" refers to waste obtained by crushing electronic/electric devices such as waste home electric appliances, PCs, and mobile phones, recovering them and then crushing them to an appropriate size. In the present invention, the crushing for obtaining the electronic/electrical device component waste may be performed by an operator. However, crushed objects may be purchased on the market.

The crushing method is carried out by any apparatus that is not limited to a specific apparatus, and may be carried out in sharing or shock manner. It is desirable to carry out crushing such that the shape of the component is maintained as much as possible. Therefore, the apparatus does not include one belonging to the category of a crusher in which fine crashing is intended.

The electronic/electrical device component waste according to the present embodiment can be classified into component waste consisting of synthetic resins (plastics) used for substrates, parts and casings; wire wastes; metals; film-shaped component waste; powders generated by crushing or crushing; and others, and they can be further classified into subclasses depending on purposes of the processing. In the present embodiment, the electronic/electrical device component waste that has been crushed to a particle diameter of 50 mm or less and has a percentage of a single component separated as component waste of 70% or more may preferably be processed, although not limited thereto.

In an embodiment, the physical sorting step preferably removes component waste containing Sb, or materials containing at least one selected from the group consisting of Sb, Al, Fe, and Ni as smelting inhibitors. For removal of the materials containing Sb, the effects of the present invention can be produced by removing the synthetic resins containing Sb. Examples of the component waste including the synthetic resins containing Sb include scrap of waste printed circuit board having no wiring, coatings of conductive wires, and the like.

In order to remove materials containing at least one selected from the group consisting of Al, Fe and Ni as smelting inhibitors, for example, metals such as iron, aluminum and SUS can be removed. These component wastes can be selectively removed for each component in the physical sorting step as described below, so that the carried smelting inhibitors, which are contained in the electronic/electrical device component waste, can be minimized.

Examples of materials containing larger amounts of halogen elements such as Cl, Br and F include vinyl chloride resins, and synthetic resins such as Teflon® having heat resistance and heat resistant ABS. By selectively removing these materials, the smelting inhibitors in the electronic/electrical device component waste can be effectively removed.

The physical sorting method can preferably carry out at least a wind sorting step in at least two stages and a sorting step with a metal sorter, for at least the electronic/electrical device component waste as the raw material.

(1) First Wind Power Sorting Step

The wind power sorting is a method suitable for processing of a large quantity of materials, among many physical sorting methods, and is preferably used in an initial stage of the physical sorting method. The physical sorting method according to the present embodiment can preferably carry out at least two stages of the wind power sorting step in the initial stage.

In the first wind power sorting step, powdery materials and film-shaped component waste (film-shaped resins, aluminum foils, and the like) as materials that will adversely affect the subsequent sorting step are sorted and removed from the electronic/electrical device component waste as the raw material. This serves as pre-processing for the subsequent step and is categorized as coarse sorting.

By the wind power sorting, the materials were divided into light weight materials and heavy weight materials. The powdery materials and film-shaped waste (resins, aluminum foils, and the like) are sorted as the light weight materials are sent to the next step, i.e., a second wind power sorting step.

An air volume of a first wind sorter can be set to 5 to 20 m/s, more preferably 5 to 12 m/s, further preferably about 5 to 10 m/s, and even more preferably 6 to 8 m/s, although not limited thereto.

(2) Second Wind Power Sorting Step

In the second wind power sorting step, massive metals and single component are separated as heavy weight materials, and substrates, plastics and other synthetic resins are concentrated on the light weight material side. The substrates and synthetic resins concentrated on the light weight material side are sent to the next step, i.e., a sorting step using a metal sorter.

An air volume of a second wind sorter can be set to 5 to 20 m/s, more preferably 10 to 18 m/s, further preferably 15 to 18 m/s, and even more preferably about 16 to 17 m/s, although not limited thereto.

(3) Sorting Process Using Metal Sorter

The metal sorter includes: a metal sensor for detecting a metal object in an object to be processed; and a sensor for detecting a position of the object to be processed. It is a device for shooting down a designated object (a metal object or non-metal object) with an airflow from an air valve. In this embodiment, the metal sorter is used to classify the objects to be processed into substrates substantially containing a metal (a metal object), and substrates substantially containing no metal and synthetic resins (a non-metal object). When the non-metal object is shot down as a designated object, the substrates containing valuable metals such as copper and precious metals are concentrated on the side of the sorted objects that have not been shot down by the metal sorter. Therefore, by using these substrates as objects to be processed, the recovery efficiency of valuable metals can be increased with a lower amount of component waste introduced.

If powdery materials are mixed in the objects to be processed, the metal sorter may lead to deterioration of visibility of a camera due to flying-up of the powdery materials during sorting, which may be difficult to identify the objects to be removed using the camera. According to the method according to the embodiment of the present invention, the powdery materials, the film-shaped component waste and the like contained in the electronic/electrical device component waste, which causes a decrease in the sorting efficiency of the sorting step using the metal sorter, have been removed in the first wind power sorting step, so that it is possible to suppress malfunction of the metal sorter and the decrease in the sorting efficiency due to flying-up of the powdery materials during the processing.

Furthermore, according to the embodiment of the present invention, the substrates containing a large amount of valuable metals can be concentrated by the second wind power sorting step and the metal sorter processing, so that the recovery efficiency of the valuable metals can be increased with a lower amount of the component waste introduced, in the subsequent copper smelting step.

In a general physical sorting method for concentrating metals, the metals are first recovered by performing magnetic sorting or the like. However, it was found that many components containing large amounts of valuables also have magnetism, and have very low separability from the smelting inhibitors. Further, since the magnetic sorting device has a limited processing amount per unit time, it is difficult to sort a large amount of component waste. According to the processing method according to the embodiment of the present invention, a large amount of component waste can be sorted at once by firstly performing the wind power sorting in two stages, so that more electronic/electrical device component waste (the raw material) than in the case where the magnetic sorting or the like is performed in the first stage can be sorted. After the wind power sorting in the second stages, the smelting inhibitors can be removed while increasing an amount of the electronic/electrical device component waste by combining the metal sorter processing which requires a long processing time to recover valuable metals efficiently.

Other Sorting Process

In addition to the above sorting process, it is also possible to combine the following sorting processes as needed. For example, depending on the types of the electronic/electrical device component waste, it may contain many wire waste enough to be easily identified by visual inspection. In this case, relatively large waste or the like may be manually sorted or mechanically sorted by a robot or the like, prior to the first wind power sorting step.

If the powdery materials have not been sufficiently sorted by the first wind power sorting step, a sieving step is preferably added between the first wind power sorting step and the second sorting step or after the second sorting step to further sort and remove the powdery materials. It is preferable to use a slit-shaped net having long holes in a moving direction as a sieve in that sieving step, and in this case, the conductive wire waste can also be removed. The powdery materials and the conductive wire waste after the sorting can be sent to the copper smelting step via the pre-incineration processing step, thereby more efficiently recovering the valuable metals in the component waste.

A part of the substrate waste to be processed in the copper smelting step may be mixed in the heavy weight materials obtained in the second wind sorting step. Therefore, the heavy weight materials obtained by the second wind power sorting can be further classified by magnetic separation, eddy current, color sorter and the like.

The higher metal content means that a larger amount of metal-containing component waste is present. In the presence of non-metal objects such as synthetic resins in a space between the component wastes detected as metals, the space will be erroneously detected as one metal when the space is within a detection range of the metal sensor, and the synthetic resins such as plastics, which are non-metal objects present between the metal objects, are not removed by the air valve and may be addressed as metal objects. Therefore, separation by magnetic separation, eddy current, color sorter, and the like can be carried out before performing separation by the metal sorter to decrease the metal content, thereby suppressing erroneous detection of the metal sorter.

The substrates sorted in the second wind power sorting step often have lead wires remaining on the substrates, the lead wires connecting the components with the substrates, even if the components have been removed from the substrates. Most of the lead wires are made of iron, nickel, or an alloy thereof, which are ferromagnetic materials. By combining a high magnetic force sorting step capable of removing the substrates having the lead wires remaining after the second wind power sorting step, the metal content ratio in the substances to be processed, which are sent to the metal sorter, can be decreased. The color sorter is a sorter that can distinguish objects to be sorted, based on their colors. The color sorter can recognize a metallic color, a green color of the substrates and a black or white color of the synthetic resins. Therefore, the metal content ratio in the objects to be processed can be decreased using the color sorter.

In addition, the "removed" or "separated" as used herein includes not only an embodiment of removal or separation of 100%, but also an embodiment of removal of 30% or more, more preferably 50% by mass or more in the weight ratio in the objects.

According to the method for processing the electronic/electrical device component waste according to the embodiment of the present invention, it is possible to provide a method for processing electronic/electrical device component waste, which includes the step of sorting and removing the component waste containing the smelting inhibitors for each unit of the components in the state of the component waste before crushing the electronic/electrical device component waste into powder in the smelting step, whereby the processing amount of the electronic/electrical device component waste to be processed in the smelting process can be increased, and valuable metals can be efficiently recovered.

The invention claimed is:

1. A method for processing electronic/electrical device component waste comprising:

- a step of processing the electronic/electrical device component waste in a smelting step, which comprises a step of crushing and sieving the electronic/electrical device component waste; and a step of subjecting the crushed and sieved waste to a copper smelting,
- wherein prior to the step of crushing and sieving the electronic/electrical device component waste, the method comprises a step for reducing smelting inhibitors contained in the electronic/electrical device component waste,
- wherein the step for reducing smelting inhibitors comprises:
  - a first wind power sorting of sorting the electronic/electrical device component waste to remove at least powdery materials and film-shaped component waste in the electronic/electrical device component waste;
  - a second wind power sorting of sorting the electronic/electrical device component waste in which the powdery materials and the film-shaped component waste are removed in the first wind power sorting, to sort heavy weight materials comprising the metals and light weight materials comprising synthetic resins; and
- removing synthetic resins in the electronic/electrical device component waste by subjecting the electronic/electrical device component waste classified into the light weight materials in the second wind power sorting, by using a metal sorter comprising a first sensor that is a metal sensor that detects metal objects in the light weight materials and a second sensor comprising a camera that detects a position of an object to be processed,
- wherein the metal sorter separates the metal objects or non-metal objects in the light weight materials with an air flow from an air valve, according to a detection result of the first sensor and the second sensor, and
- wherein sieving is performed between the first wind power sorting step and the second wind power sorting step to remove the powdery materials in the electronic/electrical device component waste by using a slit-shaped net having long holes in a moving direction.

2. The method for processing the electronic/electrical device component waste according to claim 1, wherein the step of processing the electronic/electrical device component waste in the smelting step comprises a step of incinerating the electronic/electrical device component waste prior to the step of crushing and sieving the electronic/electrical device component waste.

3. The method for processing the electronic/electrical device component waste according to claim 1, wherein an amount of the electronic/electrical device component waste processed is increased in the smelting step by a decreased amount of the smelting inhibitors contained in the electronic/electrical device component waste.

4. The method for processing the electronic/electrical device component waste according to claim 1, wherein the step for reducing the smelting inhibitors comprises removing component waste containing the smelting inhibitors from the electronic/electrical device component waste.

5. The method for processing the electronic/electrical device component waste according to claim 1, wherein the step for reducing the smelting inhibitors comprises sorting and removing the component waste containing the smelting inhibitors by a physical sorting step.

6. The method for processing the electronic/electrical device component waste according to claim 1, wherein the smelting inhibitors contain Sb.

7. The method for processing the electronic/electrical device component waste according to claim 1, wherein the smelting inhibitors contain at least one selected from the group consisting of Sb, Al, Fe and Ni.

8. The method for processing the electronic/electrical device component waste according to claim 1, wherein the step for reducing the smelting inhibitors comprises removing synthetic resins containing Sb.

9. The method for processing the electronic/electrical device component waste according to claim 1, wherein the smelting step comprises a copper smelting step using a flash furnace.

10. The method for processing the electronic/electrical device component waste according to claim 1, wherein the step of processing the electronic/electrical device component waste in the smelting step comprises a step of incinerating the electronic/electrical device component waste; a step of crushing and sieving the incinerated waste;

and subjecting the crushed and sieved waste to copper smelting.

11. The method for processing the electronic/electrical device component waste according to claim 1, wherein an air volume of the first wind power sorting is 5 to 12 m/s and the second wind power sorting is 10 to 18 m/s.

12. A method for processing electronic/electrical device component waste comprising:

a physical sorting step of reducing smelting inhibitors in the electronic/electrical device component waste by removing component wastes of powdery materials, film-shaped component waste, and synthetic resins, which include Sb, Al, Fe, Ni, or any combination thereof, as a smelting inhibitor; and a smelting step of processing the electronic/electrical device component waste after the physical sorting step, comprising: a step of incinerating the electronic/electrical device component waste; a step of crushing and sieving the incinerated waste; and subjecting the crushed and sieved waste to copper smelting, wherein the physical sorting step comprises;

subjecting the electronic/electrical device component waste to wind power sorting in at least two stages to remove at least the powdery materials and the film-shaped component waste in the electronic/electrical device component waste, and separating massive metals as heavy weight materials and concentrating substrates and the synthetic resins as light weight materials; and sorting the light weight materials by using a metal sorter comprising a first sensor that is a metal sensor that detects metal objects comprising the substrates in the light weight materials comprising the synthetic resins and a second sensor comprising a camera that detects a position of an object to be processed, wherein the metal sorter separates the metal objects or non-metal objects in the light weight materials with an air flow from an air valve, according to a detection result of the first sensor and the second sensor, and wherein sieving is performed between the first wind power sorting step and the second wind power sorting step to remove the powdery materials in the electronic/electrical device component waste by using a slit-shaped net having long holes in a moving direction.

13. The method for processing the electronic/electrical device component waste according to claim 12, wherein an amount of the electronic/electrical device component waste processed is increased in the smelting step by a decreased amount of the smelting inhibitors contained in the electronic/electrical device component waste.

14. The method for processing the electronic/electrical device component waste according to claim 12, wherein the heavy weight materials are sent directly from the first wind power sorting to the second wind power sorting.

15. The method for processing the electronic/electrical device component waste according to claim 12, wherein an air volume to remove the powdery materials and the film-shaped component waste is 5 to 12 m/s and an air volume to concentrate substrates and the synthetic resins as light weight materials is 10 to 18 m/s.

16. A method for processing the electronic/electrical device component waste comprising:

a step of processing the electronic/electrical device component waste in a smelting step, which comprises a step of crushing and sieving the electronic/electrical device component waste; and a step of subjecting the crushed and sieved waste to a copper smelting, wherein prior to the step of crushing and sieving the electronic/electrical device component waste, the method comprises a step for reducing smelting inhibitors contained in the electronic/electrical device component waste, wherein the step for reducing smelting inhibitors comprises:

a first wind power sorting of sorting the electronic/electrical device component waste to remove at least powdery materials and film-shaped component waste in the electronic/electrical device component waste;

a second wind power sorting of sorting the electronic/electrical device component waste in which the powdery materials and the film-shaped component waste are removed in the first wind power sorting, to sort heavy weight materials and light weight materials; and removing synthetic resins or the substrates in the electronic/electrical device component waste by subjecting the electronic/electrical device component waste classified into the light weight materials in the second wind power sorting, by using a metal sorter comprising a first sensor that is a metal sensor that detects metal objects in the light weight materials and a second sensor that detects a position of an object to be processed, wherein the metal sorter separates the metal objects or non-metal objects in the light weight materials with an air flow from an air valve, according to a detection result of the first sensor and the second sensor, and wherein the heavy weight materials are sent directly from the first wind power sorting to the second wind power sorting.

* * * * *